United States Patent [19]

Arnold III

[11] Patent Number: 5,207,524
[45] Date of Patent: May 4, 1993

[54] BALL POINT PEN REFILL ADAPTER

[75] Inventor: Remmie L. Arnold III, Chester, Va.

[73] Assignee: Arnold Pen Company, Petersburg, Va.

[21] Appl. No.: 424,192

[22] Filed: Oct. 19, 1989

[51] Int. Cl.⁵ .............................................. B43K 7/00
[52] U.S. Cl. .................................... 401/210; 285/4; 403/2; 401/209; 401/217; 428/572
[58] Field of Search ............... 401/209, 210, 97, 217, 401/210; 403/2; 285/3, 4; 428/571, 572

[56] References Cited

U.S. PATENT DOCUMENTS

| | | | |
|---|---|---|---|
| 653,912 | 7/1900 | Heggie | 403/2 X |
| 1,684,571 | 9/1928 | Boosey | 285/4 |
| 1,688,727 | 10/1928 | McWane | 285/3 X |
| 2,126,893 | 8/1938 | Klamp | 428/572 X |
| 2,778,336 | 1/1957 | Liguori . | |
| 2,803,219 | 8/1957 | Stoeberl . | |
| 2,829,623 | 4/1958 | Barnes . | |
| 2,860,602 | 11/1958 | Fisher | 401/210 |
| 3,039,437 | 6/1962 | Walker . | |
| 3,119,377 | 1/1964 | Johmann . | |
| 3,180,320 | 4/1965 | De Groft | 401/134 |
| 3,429,199 | 2/1969 | Kenyon | 403/2 X |
| 3,480,299 | 11/1969 | Henderson | 285/4 |
| 3,835,615 | 9/1974 | King, Jr. | 403/2 X |
| 3,995,888 | 12/1976 | McIlroy | 285/4 |
| 4,453,749 | 6/1984 | McKinnon | 285/4 |

FOREIGN PATENT DOCUMENTS

| | | | |
|---|---|---|---|
| 1122845 | 9/1956 | France | 401/217 |
| 656706 | 10/1963 | Italy | 401/210 |

*Primary Examiner*—Steven A. Bratlie
*Attorney, Agent, or Firm*—Patrick J. Coyne; Kenneth M. Massaroni; James Juo

[57] ABSTRACT

An adapter device is provided for varying the length of a ball point pen refill cartridge to enable the cartridge to be used in a variety of ball point pen housings. The adapter consists of a barrel which slips over the distal end of a refill cartridge and is securely connected to the cartridge by a channel formed in the barrel. The barrel comprises detachable sections which are removed as necessary so that the cartridge with the adapter attached barrel sections is substantially equal in length to the exhausted refill cartridge. The channel permits air to flow to the ink cartridge, enabling ink to be flow easily from the cartridge.

10 Claims, 3 Drawing Sheets

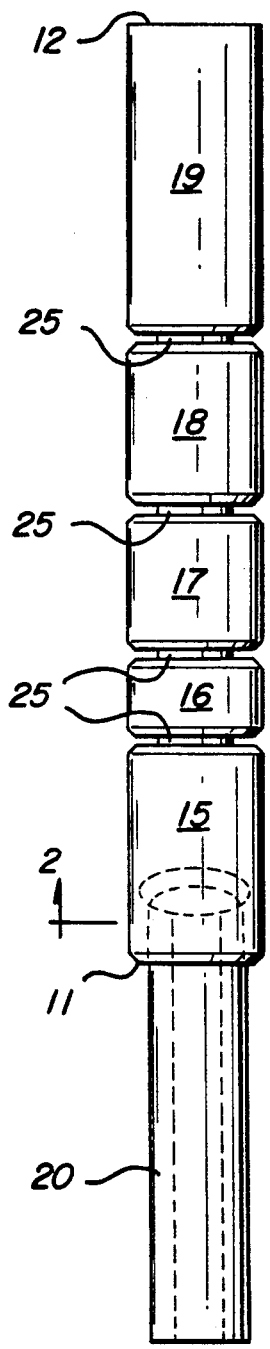
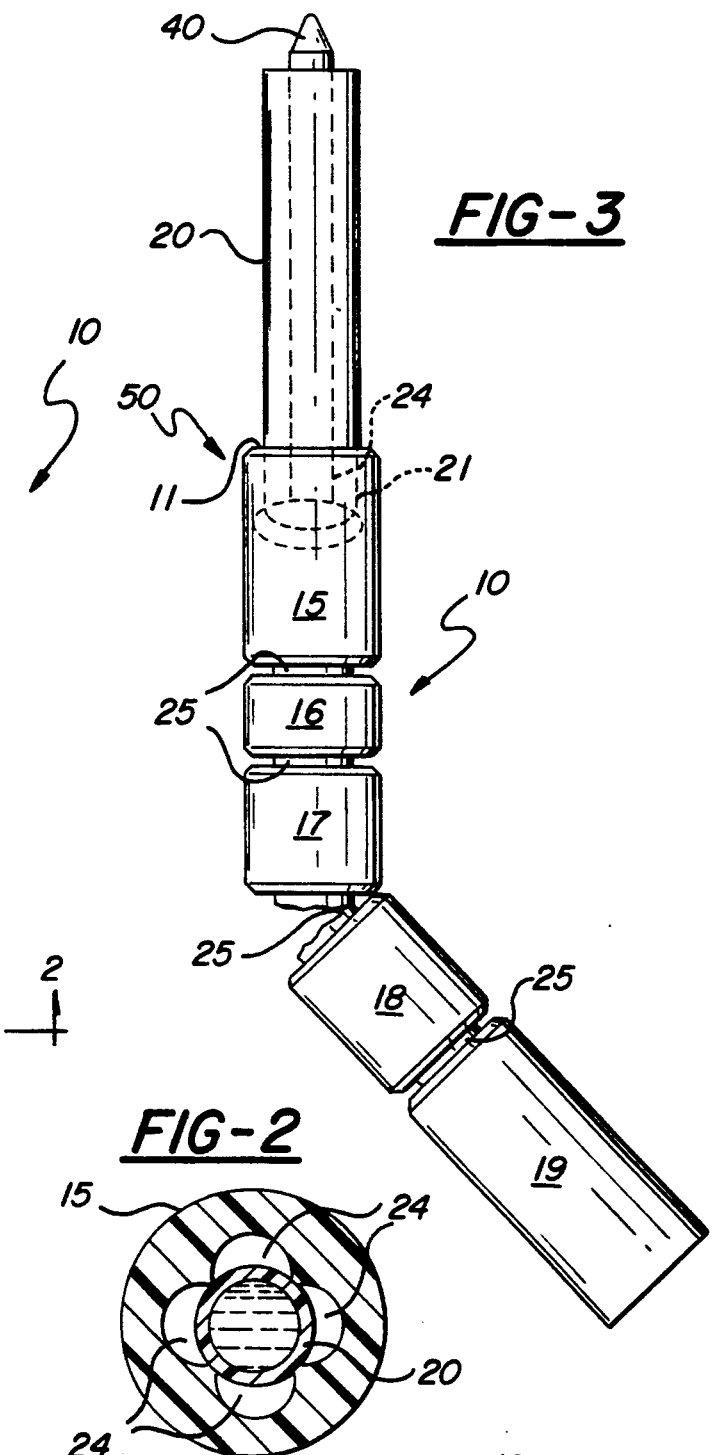
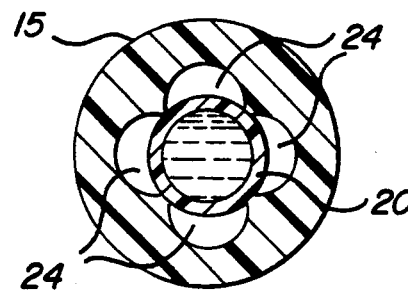
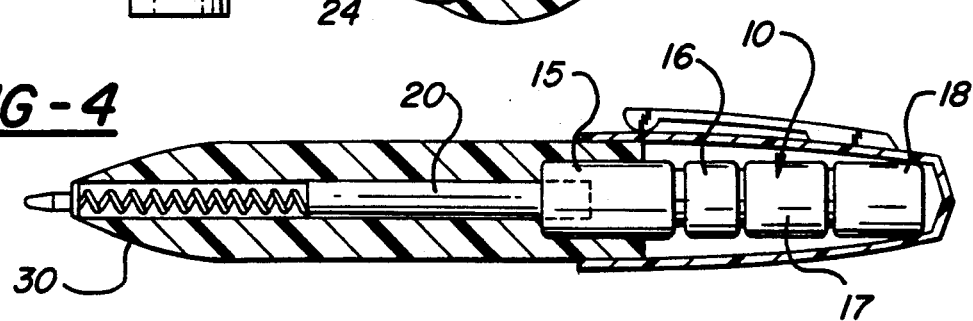

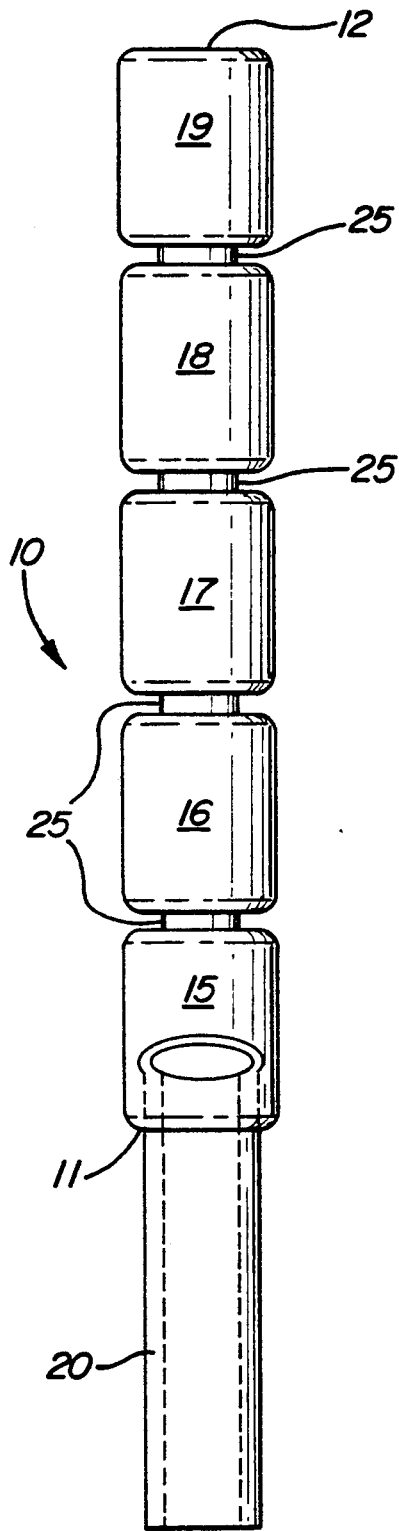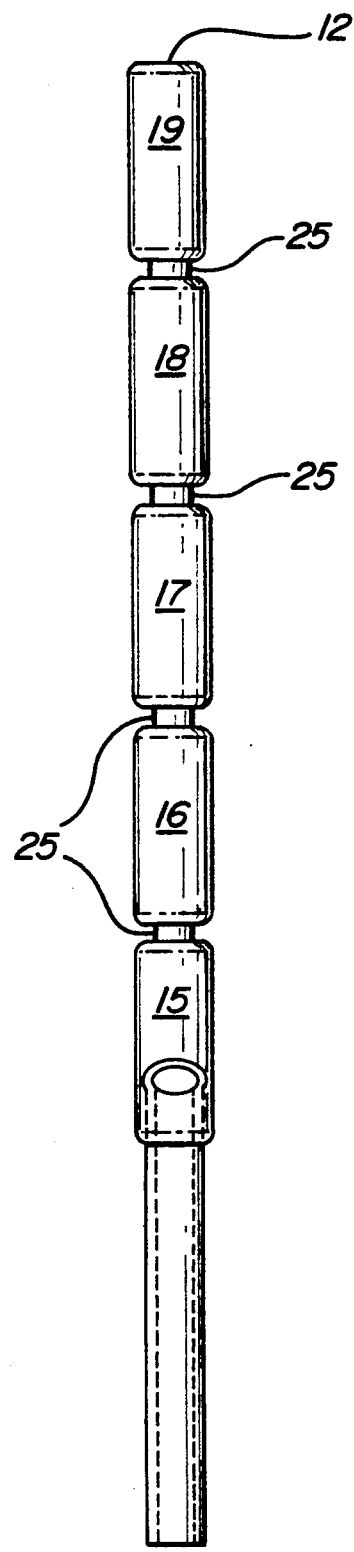

BALL POINT PEN REFILL ADAPTER

FIELD OF THE INVENTION

The present invention relates to an adapter for pen refill cartridges and, in particular, to an adapter for modifying the length of a standard pen refill cartridge to enable the cartridge to fit in a wide variety of pen housings.

BACKGROUND OF THE INVENTION

There are numerous varieties of ball point pens manufactured today. One category of ball point pens manufactured include pens with replaceable ink cartridges. With such pens, a refill ink cartridge can be substituted for the exhausted ink cartridge, restoring the usefulness of the pen once the ink supply is exhausted. With the wide variety of ball point pens manufactured today to appeal to the wide variety of individual tastes, the size and shape of these pens and refills varies considerably. The differences in the structure of these pens results in differences in the structure of housing in which the pen refill cartridge must be placed and in the configuration and dimensions of the ink cartridge itself.

The proper functioning of a pen depends upon whether the refill cartridge is adapted to fit within the housing in which the refill cartridge is used. If the cartridge does not fit properly, the cartridge will not extend and retract properly within the housing. Among the problems that can result are: the ink may not flow; if the cartridge is too short, the ball point tip on the cartridge may not reach the writing surface; if the cartridge is too long, the tip may be subjected to excessive forces, or the ball point tip may automatically retract into the housing. As a result, standard refill cartridges cannot fit all different makes and models of pens manufactured today. A device which can adapt refill cartridges to fit a wide variety of different pen housings is desirable. With the constant change in the structure of commercial pens, stores cannot possibly stock refill cartridges to fit every pen manufactured. Moreover, with so many different sized refill cartridges available, finding the proper sized cartridge that fits a particular pen leads to confusion of both the merchant and the customer.

Prior attempts have been made to develop adapters which can be used with a variety of refill cartridges. These adapters alter the length of the cartridge enabling it to fit into different sized ball point pen housings. One such device employs adapters of varying lengths sold as a kit. These adapters can be either screwed on or plugged into a standard sized cartridge to elongate the cartridge. In general, the length of the adapters sold in the kit correspond to the most popular pen sizes in use. One problem with this approach is that it is wasteful. One is required to purchase an entire kit to obtain the one adapter that is needed to adapt a cartridge to fit a particular pen. In addition, if a consumer purchases a pen whose size does not correspond to the adapters provided in the kit, the adapters will be inappropriate, and the consumer must buy a cartridge specifically designed for their pen.

Further, unless the ink cartridge is pressurized, the ink inside a cartridge will not properly dispense the ink. Some kit-type adapters require that a small hole be drilled in the side of the cartridge after the adapter is mated with the cartridge to provide ventilation. If the hole is not properly made in the cartridge, the cartridge may leak or not provide an adequate flow of ink.

A second prior art approach employs refill cartridges with segmented scribed lines. Once the necessary length of the refill cartridge required to fit within the pen housing is determined, the refill cartridge is bent along the scribed lines closest to the length of the exhausted cartridge and the excess portion of the refill cartridge is thereby removed. One disadvantage of this type of adaptable refill cartridge is that the cartridge itself must be bent to break off the segments. If the bending is not properly done, the ink may dispense from the cartridge or additionally, ventilation of the ink supply may be inhibited, preventing the proper flow of ink. A second disadvantage of this type of segmented refill cartridge is that the consumer is prevented from buying a refill cartridge of his choice. With this device, the cartridge itself is adapted to obtain the necessary size required for the pen housing. If the type of ink or ball point tip used with this cartridge is not to the customer's liking, this device is unacceptable. This adaptable refill cartridge further requires merchants to stock, in addition to the regular standard refill cartridges, a wide variety of ink types and ball point tip sizes for these adapter cartridges. Moreover, refill cartridges of this type are typically more expensive than standard refill cartridges.

None of the known prior art devices solves the need for adapting standard pen refill cartridges to fit a variety of pen housings. Thus, a need exists for an inexpensive, efficient, easy to use adapter which can be used with many different types of standard refill cartridges to increase their length to enable them to fit within a variety of pen housings.

SUMMARY OF THE INVENTION

The present invention overcomes the disadvantages of prior art adapters. In one preferred embodiment, the adapter of the present invention includes a substantially tubular barrel having proximal and distal ends, wherein the barrel has an inner passage along its longitudinal axis and a plurality of detachable sections for modifying the length of the adapter. The proximal end of the barrel is adapted to cooperate with the distal end of the pen refill cartridge to couple the adapter to the refill cartridge.

The barrel slides over the distal end of a standard refill cartridge. The segmented sections are divided by scribed notches of smaller diameter than the segmented sections to provide easy breaking. Each segmented section of the barrel may vary in length. The barrel is made of any suitable material such as plastic, metal, etc. to enable the sections to break easily from the barrel. The material of the barrel and the decreased width of the notches enable the sections of the barrel to be easily broken off as necessary to modify the length of the refill cartridge to fit within the housing. The inner surface of the barrel forms a channel to permit the flow of air to reach the cartridge. The inner surface of the barrel is constructed to enable the adapter to remain securely attached to the standard refill cartridge.

It is a principal advantage of the adapter of the present invention to provide a pen refill adapter that can extend a standard refill cartridges to varying lengths.

An additional advantage of the present invention provides an adapter that will enable a standard refill cartridge to be used with a variety of pen housings.

A further advantage of the present invention is to provide a cartridge adapter that is inexpensive, economical, and easy to use.

A further advantage of the present invention is to provide an adapter that is reusable.

Another advantage of the present invention is to provide an adapter that enables the ink cartridge to always remain exposed to the atmosphere, enabling the ink to flow easily.

Still a further advantage of this invention is to provide an adapter that attaches securely to a standard refill cartridge.

BRIEF DESCRIPTION OF THE DRAWINGS

FIG. 1 is a side view of a pictured embodiment of the adapter of the present invention mated with a standard refill cartridge.

FIG. 2 is a cross-sectional view of the adapter shown in FIG. 1.

FIG. 3 is a perspective view of the adapter of FIG. 1 being adapted to fit a pen housing by removing segments from the adapter.

FIG. 4 is an exploded view of the adapter of FIG. 1 shown in a pen housing.

FIG. 5 is a side view of FIG. 1 with the segments of the adapter being of equal length.

FIG. 6 is a side view of FIG. 1 with the adapter being of a diameter proportional to mate with the refill cartridge.

DETAILED DESCRIPTION

Figure 7:
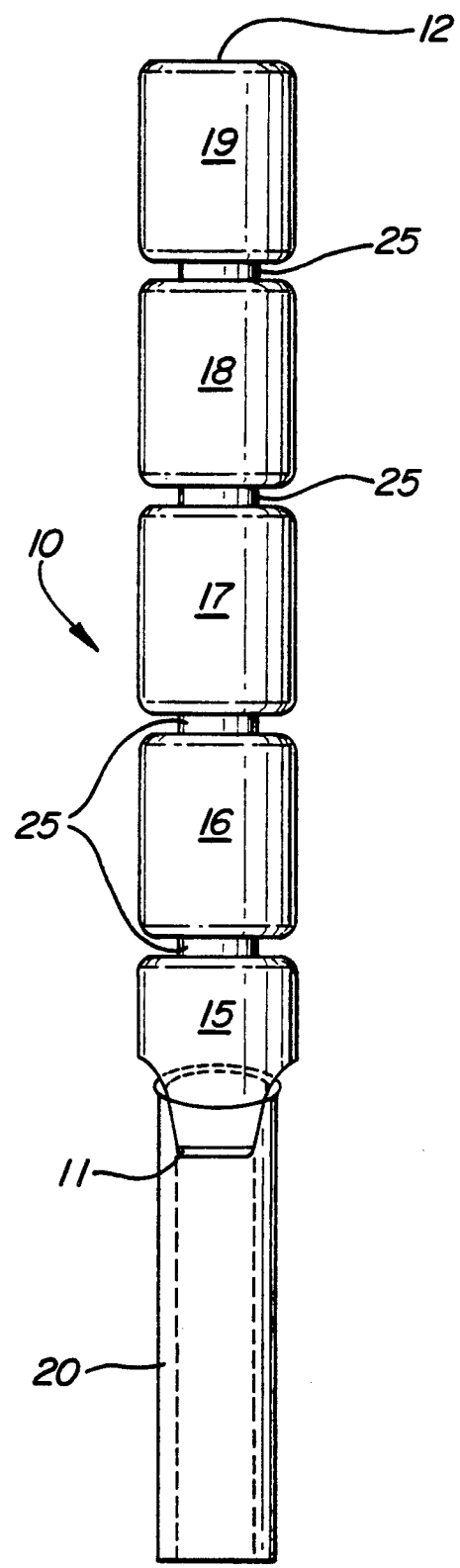
FIG. 7 is a side view of another embodiment of the invention with the proximal end of the adapter being of width smaller than the width of the refill cartridge.

Reference will now be made in detail to a present preferred embodiment of the invention, an example of which is illustrated in the accompanying drawings, which are incorporated herein and made a part of this specification by reference. A preferred embodiment of the invention is shown in FIG. 1.

In a preferred embodiment, the present invention has a barrel 10. Barrel 10 can be made of any suitable material such as metal, rigid plastic material, etc. Barrel 10 has proximal 11 and distal 12 ends, one or more detachable sections 15-19, and an air channel 24 formed therein. In the preferred embodiment of the present invention, proximal end 11 of barrel 10 slides over distal end 21 of cartridge 20 to extend the length of cartridge 20.

The segmented sections 15-19 are separated by notches 25. Notches 25 have an outer diameter less than the outer diameter of segmented sections 15-19. This reduced diameter enables segmented sections 15-19 to easily be broken away from barrel 10 as needed, to provide barrel 10 with the required added length necessary for the cartridge 20 to fit within pen housing 30.

It will be apparent to those skilled in the art that numerous modifications and variations may be made to segmented sections 15-19 without departing from the spirit or scope of the invention. Segmented sections 15-19 of barrel 10 can be increased in number to provide enough additional length to satisfy any pen housing 30. Segmented sections 15-19 can be of varying length or similar length. Additionally, segmented sections 15-19 are shown to be substantially cylindrical in shape. Alternatively, segmented sections 15-19 and notches 25 can be of any shape provided the width of notches 25 is smaller than the width of segmented sections 15-19 so that segmented sections 15-19 can be easily broken away from barrel 10.

FIG. 2 shows the inner surface of barrel 10. The inner surface includes one or more air channels 24. Channel 24 is shown to be in a clover leaf shape. Alternatively, channel 24 can be of any shape provided it is adapted to securely barrel 10 to pen refill cartridge 20. Channel 24 of barrel 10 allows the air to flow through the hollow barrel 10 to reach the ink in cartridge 20.

Distal end 12 of barrel 10 is exposed to atmospheric pressure. Proximal end 11 of barrel 10 connects with distal end 21 of cartridge 20. Channel 24 extends from distal end 12 of barrel 10 to distal end 21 of cartridge 20 to enable atmospheric pressure to reach the ink in cartridge 20. The atmospheric pressure enables the ink to easily flow from the pen. In a preferred embodiment of the invention, proximal end 11 of barrel 10 slides over distal end 21 of cartridge 20. It will be apparent to one of ordinary skill in the art that proximal end 11 of barrel 10 can connect with distal end 21 of cartridge 20 in a number of ways.

In use, the appropriate length of cartridge 20 is first determined. Barrel 10 is inserted over distal end 21 of refill cartridge 20, opposite ball point tip 40. Channel 24 creates a snug fit between barrel 10 and cartridge 20. With barrel 10 securely in place over cartridge 20, segmented sections 15-19 can be removed from barrel and cartridge assembly 50 as necessary so that cartridge 20 is comparable in length to the exhausted cartridge. Segmented sections 15-19 are removed from barrel 10 as needed by bending at the appropriate break-off notch 25 until extra segmented sections 15-19 are removed. Once extra segmented sections 15-19 are removed from barrel 10, barrel and cartridge assembly 50 is at the proper length.

The ink within barrel and cartridge assembly 50 is exposed to the atmospheric pressure through channel 24. Channel 24 is adapted to fit around distal end 21 of cartridge 20 and allow the ink in cartridge 20 to be exposed to the air. Once a secure fit is achieved between barrel 10 and cartridge 20, and barrel and cartridge assembly 50 is adapted to the proper length, barrel and cartridge assembly 50 is inserted into pen housing 30.

It will be apparent to those skilled in the art that various modifications and variations can be made in barrel 10 and channel 24 without departing from the scope or spirit of the invention. For example, in addition to increasing the length of cartridge 20, barrel 10 can be used to increase the width of the cartridge 20. Thus, by sliding barrel 10 completely over cartridge 20, the width of cartridge 20 can be increased to the width of barrel 10. Additionally, the shape and configuration of channel 24 can be of any design provided a secure fit is achieved between barrel 10 and cartridge 20. Similarly, the shape and configuration of barrel 10 can be of any design provided that when adapted with cartridge 20 it can fit within pen housing 30.

In addition, as shown in FIG. 7, proximal end 11 of barrel 10 may be of a width smaller than the width of distal end 21 of cartridge 20 such that barrel 10 can slide into cartridge 20. Proximal end 11 of barrel 10 may also be beveled to allow for ease of mating while providing a secure fit when connected with distal end 21 of cartridge 20. As previously mentioned, it will be apparent to those skilled in the art that various modifications and variations can also be made to segmented sections 15-19 and notches 25 without departing from the spirit or scope of the invention. It is intended that the present invention cover the modifications and variations of the invention, provided they come within the scope of the appended claims and their equivalents.

I claim:

1. An adapter for a cylindrical pen refill cartridge having proximal and distal ends for use in different pen housings, comprising, said cylindrical pen refill cartridge having proximal and distal ends;

a substantially tubular barrel fabricated of a flexible, resilient material and having proximal and distal ends;

said barrel further comprising a central passage formed therein along its longitudinal axis communicating between said proximal and distal ends for admitting air to the pen refill cartridge and for exposing the pen refill cartridge to atmospheric pressure at said distal end of said barrel to enable ink to flow within the pen refill cartridge;

means for providing a frictional coupling of said passage with said cylindrical pen refill cartridge to enable said barrel to cooperate securely with said cylindrical pen refill cartridge;

a plurality of easily detachable sections for modifying the length of the adapter;

said proximal end of said barrel being adapted to mate with and slide over said distal end of the cylindrical pen refill cartridge to couple the adapter to the refill cartridge and maintain said barrel relative to said cylindrical pen refill cartridge;

said detachable sections having a first circumference and said barrel between said detachable sections having a second circumference wherein the circumference of the pen refill cartridge is greater than said second circumference, and said first circumference is greater than said circumference of the pen refill cartridge;

said first circumference, when cooperating with said distal end of said cylindrical pen refill cartridge, will fit over said cylindrical pen refill cartridge to closer approximate the circumference of said cylindrical pen refill cartridge to an interior circumference of a generic pen housing;

said second circumference for adapting said proximal end of said barrel to cooperate with the distal end of said pen refill cartridge and for adapting the sections to be detachable.

2. The adapter according to the claim 1, wherein said detachable sections of said barrel are of unequal length.

3. The adapter according to claim 1, wherein said detachable sections of said barrel are equal in length.

4. The adapter according to claim 1, wherein said first circumference of said detachable sections of said barrel varies in circumference relative to the circumference of the pen refill cartridge.

5. The adapter according to claim 1, wherein said passage is clover leaf in shape to enable the barrel to cooperate securely with the pen refill cartridge.

6. An adapter for modifying the length of a cylindrical pen refill cartridge comprising, said cylindrical pen refill cartridge having proximal and distal ends;

a substantially cylindrical barrel fabricated from a flexible and resilient material and having proximal and distal ends;

said barrel further comprising a passage formed therein for admitting air to the refill cartridge extending along its longitudinal axis, and means for providing a frictional coupling of said passage with said pen refill cartridge to enable the barrel to cooperate securely with said pen refill cartridge;

a plurality of easily detachable sections for modifying the length of the adapter;

said passage being exposed to atmospheric pressure at said distal end of said barrel to enable ink within the pen refill cartridge to flow;

said barrel being made of a resilient material whereby said proximal end of said barrel can easily slide into said distal end of the pen refill cartridge and maintain said barrel relative to the pen refill cartridge, said passage being adapted to cooperate with the distal end of said cylindrical pen refill cartridge to connect the adapter to the pen refill cartridge and maintain said barrel relative to said pen refill cartridge;

said detachable sections having a first circumference and said barrel between said detachable sections having a second circumference and the proximal end of said detachable sections having a third circumference; wherein said third circumference is less than the circumference of the pen refill cartridge, said first circumference is greater than the circumference of said pen refill cartridge, and said first circumference is greater than said second circumference;

said first circumference, when cooperating with said distal end of said pen refill cartridge, will fit over said pen refill cartridge to closer approximate the circumference of said pen refill cartridge to an interior circumference of a generic pen housing; and said second circumference for adapting the sections to be detachable.

7. The adapter according to claim 6, wherein said sections of said barrel are of unequal length.

8. The adapter according to claim 6, wherein said sections of said barrel are equal in length.

9. The adapter according to claim 6, wherein said proximal end of said barrel is beveled.

10. The adapter according to claim 6, wherein said second circumference of said barrel varies in circumference relative to the circumference of the pen refill cartridge.

* * * * *